(12) United States Patent
Yang (10) Patent No.: US 11,928,709 B2
(45) Date of Patent: Mar. 12, 2024

(54) METHOD AND APPARATUS FOR AUTOMATICALLY PROVIDING ADVERTISEMENTS

(71) Applicant: Walmart Apollo, LLC, Bentonville, AR (US)

(72) Inventor: Peng Yang, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 142 days.

(21) Appl. No.: 16/195,797

(22) Filed: Nov. 19, 2018

(65) Prior Publication Data
US 2020/0160389 A1 May 21, 2020

(51) Int. Cl.
*G06Q 30/00* (2023.01)
*G06F 16/951* (2019.01)
*G06N 7/01* (2023.01)
*G06Q 30/0251* (2023.01)

(52) U.S. Cl.
CPC ....... *G06Q 30/0256* (2013.01); *G06F 16/951* (2019.01); *G06N 7/01* (2023.01)

(58) Field of Classification Search
CPC ..... G06Q 30/0256; G06Q 30/02–0277; G06N 7/005
See application file for complete search history.

(56) References Cited

U.S. PATENT DOCUMENTS

| 2008/0103893 A1* | 5/2008 | Nagarajan | G06Q 30/0263 |
| | | | 705/14.41 |
| 2008/0167913 A1* | 7/2008 | Wiswell | G06F 16/9535 |
| | | | 705/14.54 |
| 2009/0030801 A1* | 1/2009 | Meggs | G06Q 30/0277 |
| | | | 705/14.39 |

(Continued)

FOREIGN PATENT DOCUMENTS

WO    WO-2018190773 A1 * 10/2018    ............... G06K 9/00

OTHER PUBLICATIONS

Lee, Wendy, "Quibi has partnered withT-Mobile as it prepares for April launch",https://www.latimes.com/entertainment-arts/business/story/2019-10-18/quibi-has-partnered-with-t-mobile,Oct. 18, 2019,8pages.*

*Primary Examiner* — Raquel Alvarez
(74) *Attorney, Agent, or Firm* — Morgan, Lewis & Bockius LLP; Manita Rawat (57) ABSTRACT

This application relates to apparatus and methods for determining data outputs to advertise on a platform such as a website. A computing device receives a website search request and determines a search term keyword. The computing device also determines a plurality of item accounts, such as sponsor campaigns, based on the search term keyword and a corresponding keyword of each item account. Each item account also includes a corresponding data output, such as a digital advertisement. The computing device identifies one of the item accounts based on determining an (Continued)

engagement probability for the digital advertisement of each item account. The engagement probability is determined based on aggregated impression and engagement data for the digital advertisement. The computing device provides the digital advertisement for the identified item account to a server, which may display the digital advertisement on the platform.

13 Claims, 6 Drawing Sheets

(56) References Cited

U.S. PATENT DOCUMENTS

| | | | |
|---|---|---|---|
| 2011/0179009 A1* | 7/2011 | Nam ................... | G06Q 30/0256 707/708 |
| 2016/0189218 A1* | 6/2016 | Kota ..................... | G06F 16/951 705/14.54 |
| 2018/0047049 A1* | 2/2018 | Modarresi .......... | G06Q 30/0246 |

* cited by examiner

METHOD AND APPARATUS FOR AUTOMATICALLY PROVIDING ADVERTISEMENTS

TECHNICAL FIELD

The disclosure relates generally to advertising and, more specifically, to automatically providing advertisements for display.

BACKGROUND

An advertisement may be a presentation or communication to promote an item, such as a product or service, for purchase. At least some advertisements are digital advertisements, which include a digital representation of the presentation or communication, such as one displayed on a website. A sponsor of an advertisement, such as a business, may seek to sell the item in the advertisement. The sponsor may advertise the item in the advertisement to notify potential buyers of the sale of the item, thereby increasing the chances of selling the item. For example, the sponsor may advertise the item on a website, such as a retailer's website.

At least some sponsors of digital advertisements pay a fee to have an item advertised. For example, some sponsors of advertisements pay a fee to a retailer to advertise a sponsor's product on the retailer's website. For advertisements on a webpage, the amount of the fee may depend on a number of user interactions, such as user clicks, the advertisement receives. However, not all customers that view the advertisement will click on the advertisement. For example, a customer may not have an interest in the advertised item. Moreover, not all customers are interested in the same products. As such, it is beneficial to a retailer to provide on an advertising platform, such as the retailer's website, digital advertisements of products that interest customers such that they are more likely to interact with the advertisement.

SUMMARY

The embodiments described herein are directed to automatically providing advertisements, such as, for example, digital advertisements, on a website. The embodiments may select and provide a digital advertisement to a customer with which the customer is more likely to interact. For example, the embodiments may select digital advertisements for items that customers are more likely to purchase. As a result, the embodiments may allow a retailer to increase the amount of fees collected from advertisers (e.g., increase digital advertisement revenue), among other advantages.

In accordance with various embodiments, exemplary systems may be implemented in any suitable hardware or hardware and software, such as in any suitable computing device. For example, in some embodiments, a computing device and a server are provided. The computing device is communicatively coupled to the webserver and configured to receive, from the server, a search request that includes at least one search term. The computing device may be configured to determine a search term keyword based on the at least one search term. The computing device may further determine a plurality of item accounts, such as sponsor campaigns, based on the determined search term keyword and an item keyword for each of the plurality of item accounts. Each of the plurality of item accounts may include at least one item keyword and at least one corresponding data output, such as a digital advertisement. The computing device may be configured to determine an engagement probability for each corresponding data output for each of the plurality of item accounts, and identify an item account of the plurality of item accounts based on the determined engagement probabilities. For example, the computing device may select the item account with the highest average engagement probabilities. The computing device may also be configured to provide data output data to the server identifying any corresponding data outputs for each identified item account. The server may then display the data outputs on a website, such as a retailer's website.

In some examples, a method is provided that includes receiving, from a server, a search request comprising at least one search term. The method may further include determining a search term keyword based on the at least one search term, and determining a plurality of item accounts based on the determined search term keyword and an item keyword for each of the plurality of item accounts. Each of the plurality of item accounts may include at least one item keyword and at least one corresponding data output. The method may also include determining an engagement probability for each corresponding data output for each of the plurality of item accounts, and identifying an item account of the plurality of item accounts based on the determined engagement probabilities. Additionally, the method may include providing data output data to the server, where the data output data identifies the corresponding data outputs for any identified item accounts.

In yet other embodiments, a non-transitory computer readable medium has instructions stored thereon, where the instructions, when executed by at least one processor, cause a device to perform operations that include receiving, front a server, a search request comprising at least one search term. The operations may further include determining a search term keyword based on the at least one search term, and determining a plurality of item accounts based on the determined search term keyword and an item keyword for each of the plurality of item accounts. Each of the plurality of item accounts may include at least one item keyword and at least one corresponding data output. The operations may also include determining an engagement probability for each corresponding data output for each of the plurality of item accounts, and identifying an item account of the plurality of item accounts based on the determined engagement probabilities. Additionally, the operations may include providing data output data to the server, where the data output data identifies the corresponding data outputs for any identified item accounts.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Figure 1:
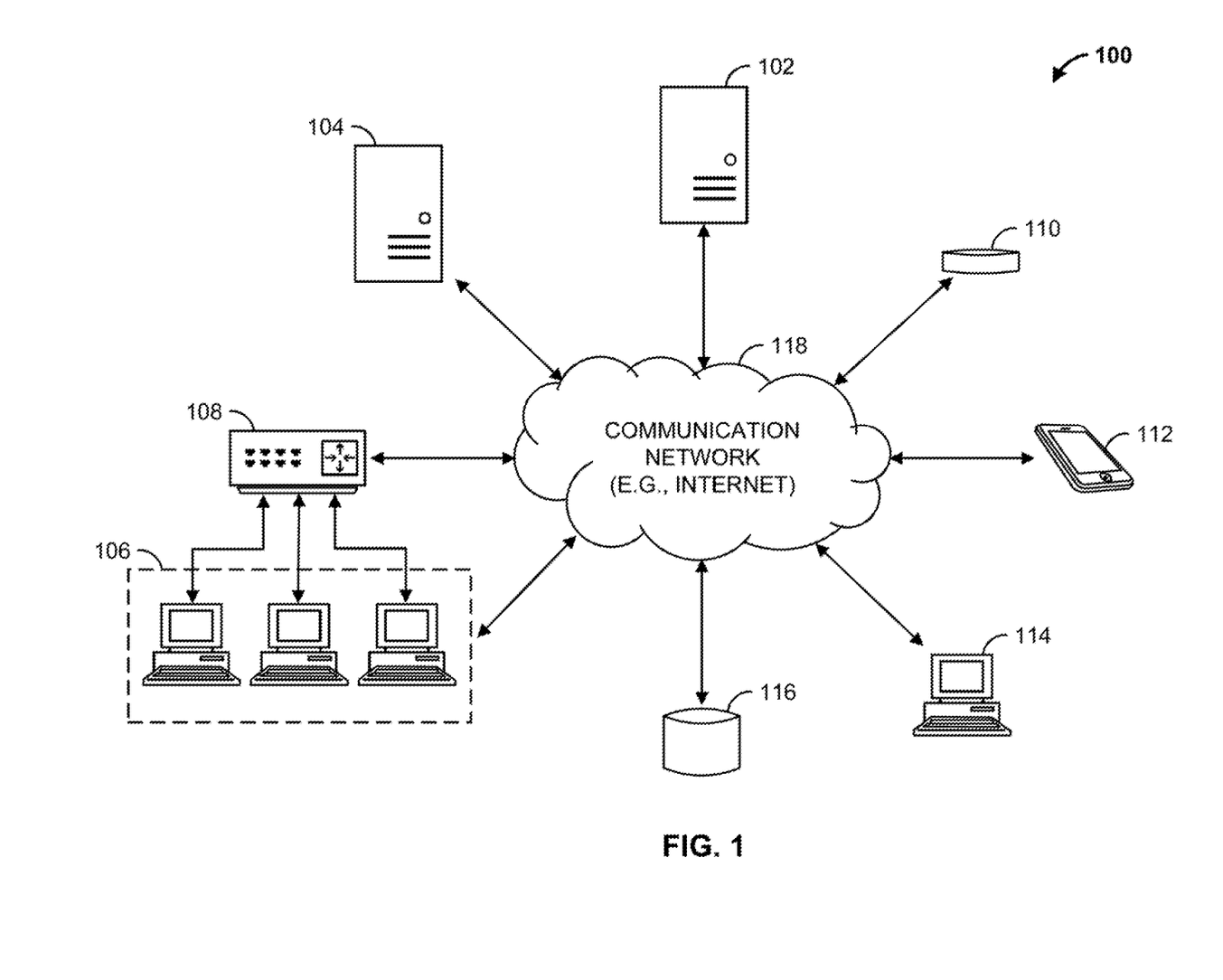
FIG. 1 is a block diagram of an automated digital advertisement identification system in accordance with some embodiments.

Turning to the drawings, FIG. 1 illustrates a block diagram of an automated digital advertisement identification system 100 that includes a digital advertisement identification computing device 102 (e.g., a server, such as an application server), a server 104 (e.g., a web server), workstation(s) 106, database 116, and multiple customer computing devices 110, 112, 114 operatively coupled over network 118. Digital advertisement identification computing device 102, server 104, and multiple customer computing devices 110, 112, 114 can each be any suitable computing device that includes any hardware or hardware and software combination for processing and handling information. In addition, each can transmit data to, and receive data from, communication network 118.

For example, digital advertisement identification computing device 102 can be a computer, a workstation, a laptop, a server such as a cloud-based server, or any other suitable device. Each of multiple customer computing devices 110, 112, 114 can be a mobile device such as a cellular phone, a laptop, a computer, a table, a personal assistant device, a voice assistant device, a digital assistant, or any other suitable device.

Additionally, each of digital advertisement identification computing device 102, server 104, and multiple customer computing devices 110, 112, 114 can include one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 110, 112, 114, automated digital advertisement identification system 100 can include any number of customer computing devices 110, 112, 114. Similarly, automated digital advertisement identification system 100 can include any number of workstation(s) 106, digital advertisement identification computing devices 102, servers 104, and databases 116.

Workstation(s) 106 are operably coupled to communication network 118 via router (or switch) 108. For example, workstation(s) 106 can communicate with digital advertisement identification computing device 102 over communication network 118. The workstation(s) 106 can allow for the configuration and/or programming of digital advertisement identification computing device 102, such as the controlling and/or programming, of one or more processors of digital advertisement identification computing device 102. Workstation(s) 106 may also communicate with server 104. For example, server 104 may be a web server and host one or more web pages, such as a retailer's website. Workstation(s) 106 may be operable to access and program (e.g., configure) the webpages hosted by server 104.

Digital advertisement identification computing device 102 is operable to communicate with database 116 over communication network 118. For example, digital advertisement identification computing device 102 can store data to, and read data from, database 116. Database 116 can be a remote storage device, such as a cloud-based server, a memory device on another application server, a networked computer, or any other suitable remote storage. Although shown remote to digital advertisement identification computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Digital advertisement identification computing device 102 can also communicate with first customer computing device 110, second customer computing device 112, and Nth customer computing device 114 over communication network 118. Similarly, first customer computing device 110, second customer computing device 112, and Nth customer computing device 114 are operable to communicate with digital advertisement identification computing device 102 over communication network 118. For example, digital advertisement identification computing device 102 can receive data (e.g., messages) from, and transmit data to, first customer computing device 110, second customer computing device 112, and Nth customer computing device 114.

Digital advertisement identification computing device 102, server 104, and workstation(s) 106 may be operated by a retailer. Customer computing devices 110, 112, 114 may be computing devices operated by customers of a retailer. In some examples, customer computing devices 110, 112, 115 are operable to view and interact with a website hosted on server 104. For example, customer computing devices 110, 112, 115 may be operable to conduct a search on a website hosted by server 104 by communicating with server 104 over communication network 118.

Automated digital advertisement identification system 100 may allow for the identification (e.g., selection) of data outputs, such as digital advertisements, in response to a search request. For example, a user may access a retailer's website and enter a search term in a search bar of the retailer's website to submit a search request. Digital advertisement identification system 100 may receive the search request and determine one or more keywords based on the search term. Digital advertisement identification system 100 may identify one or more digital advertisements to display based on the determined keywords and aggregated user interaction data. The aggregated user interaction data may include aggregated impression data and aggregated engagement data for previous digital advertisements. The impression data may identify how many times an advertisement has been displayed (e.g., viewed) on a website, and the click data may identify how many times an advertisement has been engaged (e.g., clicked on) by a user on the website.

In some examples, digital advertisement identification system 100 identifies one or more data outputs based on the determined keywords, aggregated user interaction data, and the price per engagement. The price per engagement may include a fee that a retailer receives for every engagement, such as a click, the advertisement receives.

In some examples, the data outputs include an advertisement of a brand, such as of a branded logo, and advertisements of multiple products. In some examples, digital advertisement identification system 100 displays the data outputs on the retailer's website. For example, the data outputs may be displayed near (e.g., just above or just below) the search bar of a retailer's website.

Figure 2:
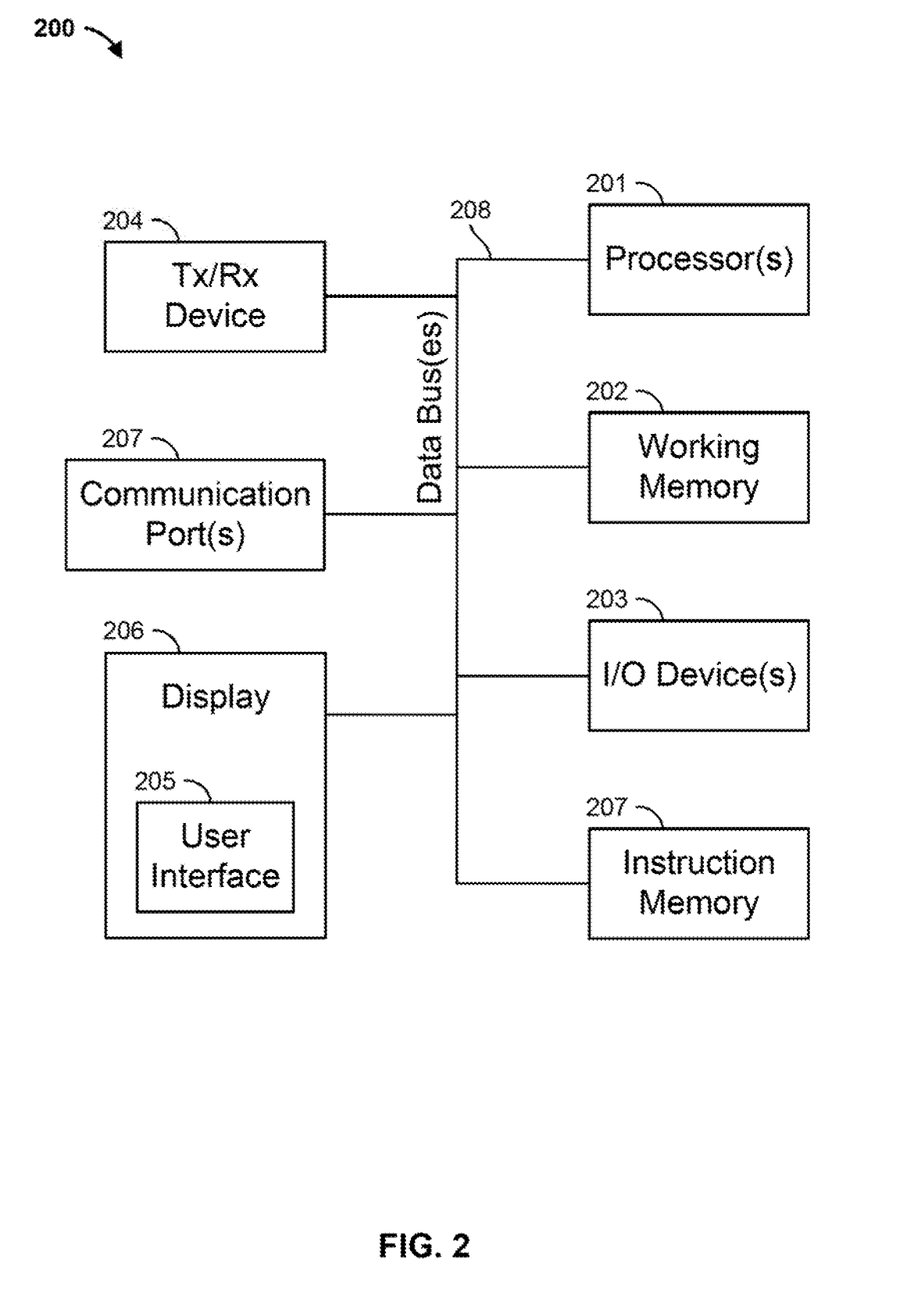
FIG. 2 is a block diagram of the digital advertisement identification computing device of the automated digital advertisement identification system of FIG. 1 in accordance with some embodiments.

FIG. 2 illustrates the digital advertisement identification computing device 102 of FIG. 1. Digital advertisement identification computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of digital advertisement identification computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as impression data and/or engagement data.

Display 206 can display user interface 205. User interfaces 205 can enable user interaction with digital advertisement identification computing device 102. For example, user interface 205 can be a user interface for an application that allows fir the viewing of semantic representations of user queries. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 digital advertisement identification computing device 102 will be operating in. Processor(s) 201 is operable to receive data from, or send data to, a network, such as communication network 118 of FIG. 1, via transceiver 204.

Figure 3:
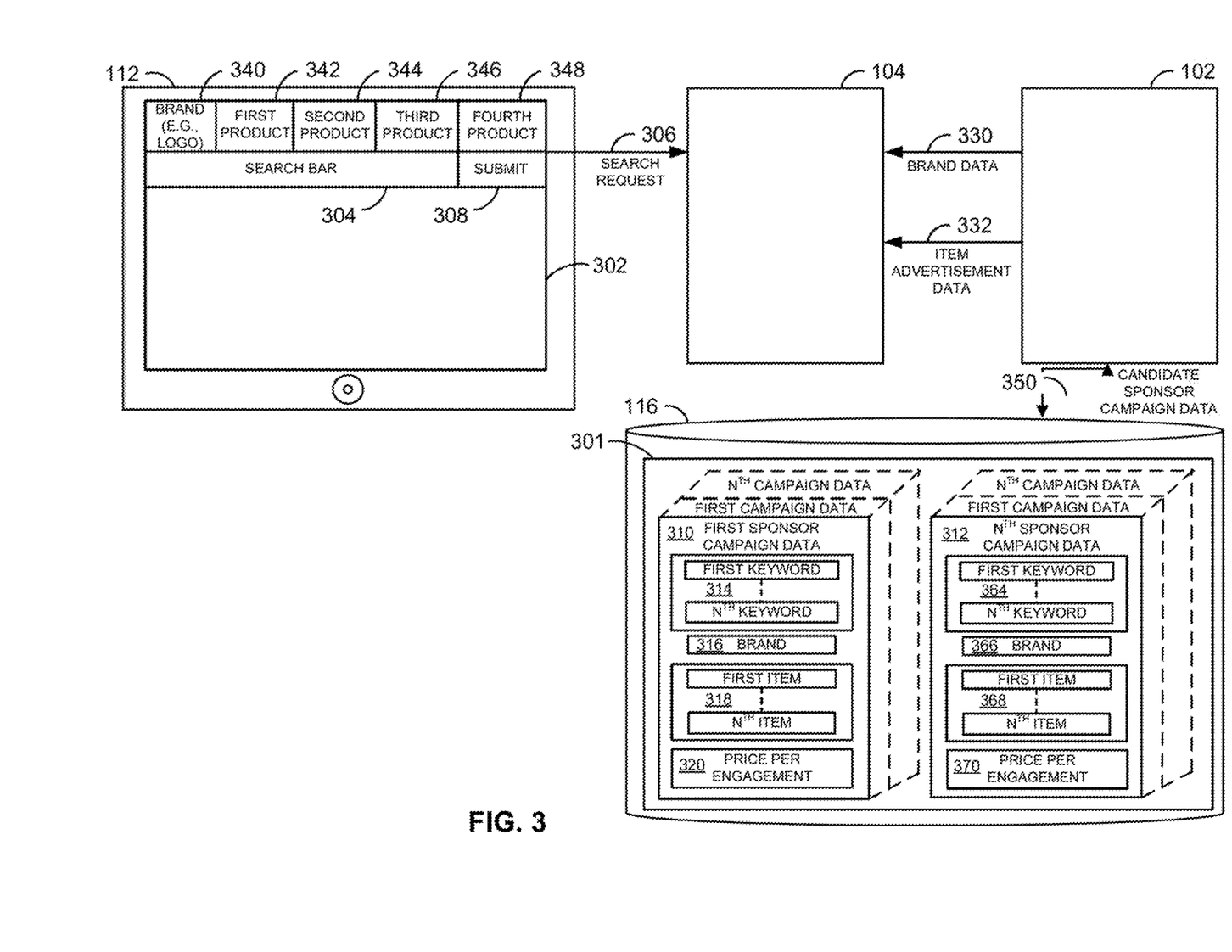
FIG. 3 is a block diagram illustrating examples of various portions of the automated digital advertisement identification system of FIG. 1 in accordance with some embodiments.

FIG. 3 is a block diagram illustrating examples of various portions of the automated digital advertisement identification system of FIG. 1. As indicated in the figure, customer computing device 112 may present a website 302 on display 206. In some examples, display 206 may be a touchscreen display. Website 302 may be a retailer's website, such as one hosted by server 104. Website 302 includes a search bar 304, which allows a user to search the retailer's website based on input provided to the search bar 304. The input may include, for example, one or more search terms. A user may provide the input with the use of, for example, I/O device 203. The user may initiate a search request 306 by providing the input to the search bar 304 and selecting the "Submit" icon 308. The search request 306 may include the one or more search terms provided by the user.

Digital advertisement identification computing device 102 is operable to receive search request 306 (e.g., via server 104) identifying one or more search terms, and determine one or more keywords based on the received one or more search terms. For example, digital advertisement identification computing device 102 may apply one or more natural language processing (NLP) algorithms, such as adaptive, statistical, or dynamic NLP algorithms, to search request 306 to determine the search terms. Digital advertisement identification computing device may then parse the received search terms to identify the keywords. In some examples, insignificant words such as "of," "in," "and," or a question mark ("?") may be parsed out. In some examples, words to be parsed out are predefined and stored in a database, such as database 116. To determine the keywords, digital advertisement identification computing device 102 may compare the words of a search term to the predefined words and parse out of the search term words that match any of the predefined words.

In some examples database 116 includes item account data. In this example, database 116 includes sponsor campaign data 301 that identifies sponsor campaigns for one or more sponsors, such as first sponsor campaign data 310 and Nth sponsor campaign data 312. Sponsor campaign data 301 may identify multiple sponsor campaigns, such as first sponsor campaign data 310 and Nth sponsor campaign data 312. Each sponsor campaign may include brand data that identifies a brand, keyword data that identifies at least one keyword, item data that identifies at least one item (e.g., a product or service), and/or price data that identifies at least one price per engagement.

For example, first sponsor campaign data 310 includes keyword data 314, which may include one or more keywords. First sponsor campaign data 310 also includes item data 318, which identifies one or more items, such as products or services. First sponsor campaign data 310 also includes brand data 316, which identifies a brand of the items identified by item data 318. The brand may be, for example, a brand of the sponsor associated with first sponsor campaign data 310. First sponsor campaign data 310 may also include price per engagement data 320, which identifies an amount of a fee that a retailer receives if a user engages the sponsor's digital advertisement, such as one provided by the retailer on the retailer's website.

Similarly, Nth sponsor campaign data 312 includes keyword data 364, which may include one or more keywords. Nth sponsor campaign data 312 also includes item data 368, which identifies one or more items for the brand identified by brand data 366. Nth sponsor campaign data 312 may also include price per engagement data 370, which identifies an amount of a fee that a retailer receives if a user engages the sponsor's digital advertisement.

Digital advertisement identification computing device 102 is operable to determine one or more sponsor campaigns identified by sponsor campaign data 301 that are associated with a same or similar keyword as the keyword determined from search request 306. In some examples, digital advertisement identification computing device 102 identifies keywords of a sponsor campaign by determining whether keyword data associated with a sponsor campaign identifies a keyword that matches a keyword determined from the search request 306. For example, digital advertisement identification computing device 102 may search database 116 to identify (e.g., select) one or more sponsor campaigns 310, 312 that include keyword data 314, 364 with a keyword that matches a keyword determined from search request 306. In some examples, digital advertisement identification computing device 102 identifies more than one sponsor campaign for a same sponsor that includes keyword data 314, 364 with a keyword that matches a keyword determined from search request 306. In some examples, digital advertisement identification computing device 102 identifies sponsor campaigns for multiple sponsors that include keyword data 314, 364 with a keyword that matches (e.g., an exact match) a keyword determined from search request 306.

Digital advertisement identification computing device 102 may then obtain candidate sponsor campaign data 350 from database 116, which includes sponsor campaign data for any identified (e.g. selected) sponsor campaigns. For example, candidate sponsor campaign data 350 may include first sponsor campaign data 310 if first sponsor campaign data 310 included keyword data 314 with a keyword that matches a keyword determined from search request 306. Similarly, candidate sponsor campaign data 350 may include Nth sponsor campaign data 312 if it includes keyword data 314 with a keyword that matches a keyword determined from search request 306.

In some examples, digital advertisement identification computing device 102 identifies keywords of a sponsor campaign by determining whether keyword data, such as keyword data 314, identities a keyword that closely matches a keyword determined from the search request 306. For example, a keyword such as "toys" determined from the search request would be determined to be a close match to a keyword "toy" identified in keyword data 314. In some examples, a phrase match or broad match determination is made. In some examples, a determination is made as to whether there is a semantic match between a keyword identified by keyword data 314 and a keyword determined from the search request 306. For example, the keyword phrase "tv speakers" may be determined to be semantically close to the keyword phrase "sound bar," and as such constitute a keyword match.

In some examples, a keyword is associated with keywords defined in a keyword list, where the keywords appearing in the keyword list are considered a close match to the keyword. The keyword list may be maintained in database 116. For example, digital advertisement identification computing device 102 may determine whether a keyword of a sponsor campaign is a close match to the keyword determined from search request 306 based on whether the keyword of the sponsor campaign appears in an associated keyword list.

Based on candidate sponsor campaign data 350 identifying sponsor campaigns that include a keyword that is the same as or similar to a keyword determined from search request 306, digital advertisement identification computing device 102 determines and provides a data output, identified in the figure as brand advertisement data 330, that identifies the brand for a corresponding sponsor campaign to digitally advertise. For example, brand advertisement data 330 may include a digital advertisement for the brand, such as a digital advertisement of a brand's logo. Digital advertisement identification computing device 102 may also determine and provide another data output, identified in the figure as item advertisement data 332, for the corresponding sponsor campaign that identifies one or more items to digitally advertise. For example, item advertisement data 332 may include one or more digital advertisements for one or more products, such as digital advertisements for four products. Digital advertisement identification computing device 102 may determine brand advertisement data 330 and item advertisement data 332 as discussed below with respect to FIG. 4.

Digital advertisement identification computing device 102 may provide brand advertisement data 330 and item advertisement data 332 to server 104, which incorporates the identified advertisements into website 302. For example, server 104 may incorporate brand advertisement 340, which is identified by brand advertisement data 330, into website 302. Web server may also incorporate one or product advertisements identified by item advertisement data 332 into website 302. In this example, server 104 incorporates first product advertisement 342, second product advertisement 344, third product advertisement 346, and fourth product advertisement 348 into website 302.

Server 104 may then provide website data 334, which identifies website 302 including the digital advertisements identified by brand advertisement data 330 and item advertisement data 332 (e.g., brand advertisement 340, first product advertisement 342, second product advertisement 344, third product advertisement 346, and fourth product advertisement 348), to customer computing device 112. For example, web server may display one or more of the digital advertisements above search bar 304, as indicated in the figure.

Figure 4:
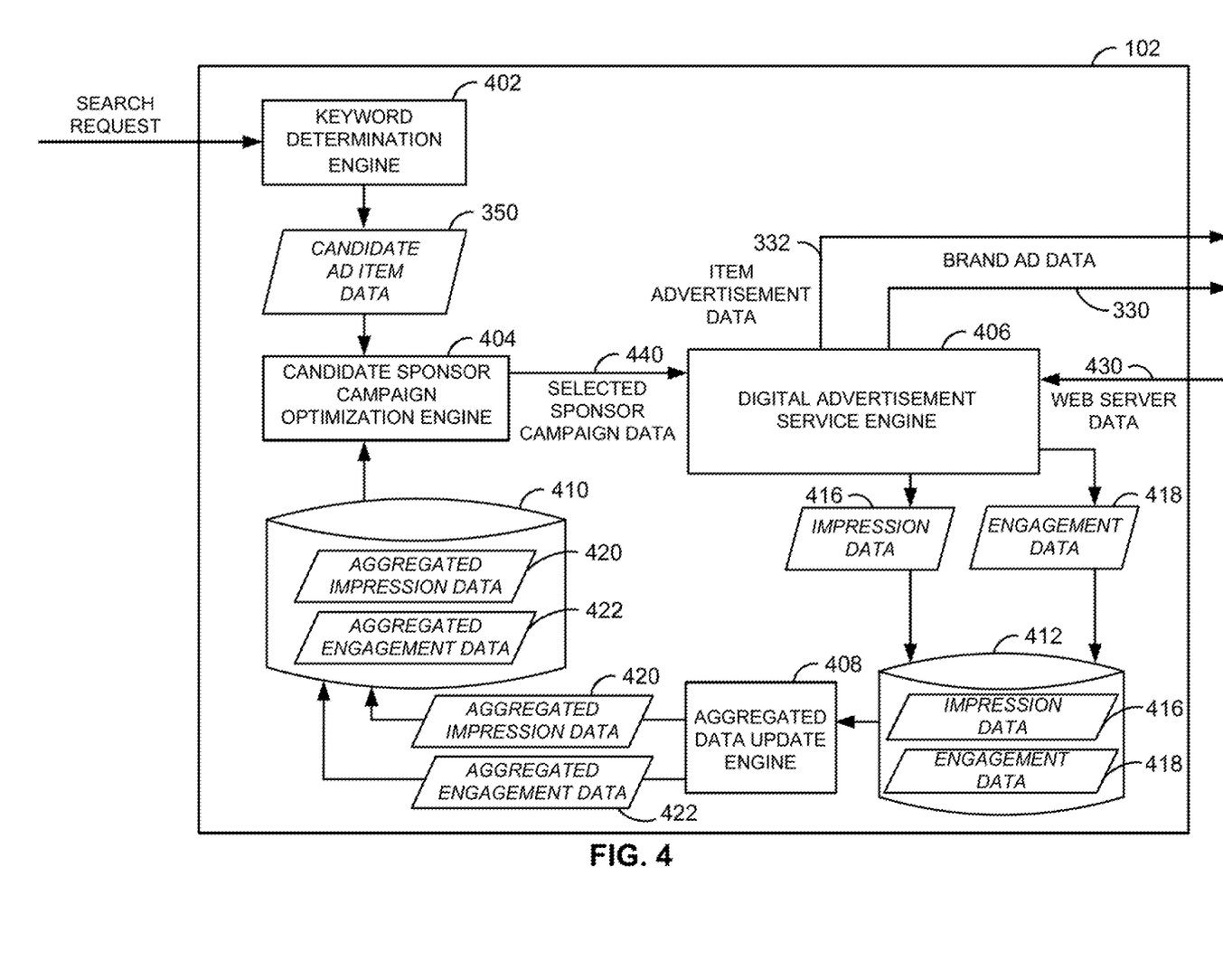
FIG. 4 is a diagram illustrating examples of various portions of digital advertisement identification computing device of FIG. 1 in accordance with same embodiments.

FIG. 4 is a diagram illustrating example of various portions of the digital advertisement identification computing device 102 of FIG. 1. As indicated in the figure, digital advertisement identification computing device 102 includes keyword determination engine 402, candidate sponsor campaign optimization engine 404, and digital advertisement service engine 406. In some examples, one or more of keyword determination engine 402, candidate sponsor campaign optimization engine 404, and digital advertisement service engine 406 may be implemented in hardware. In some examples, one or more of keyword determination engine 402, candidate sponsor campaign optimization engine 404, and digital advertisement service engine 406 may be implemented as an executable program maintained in a tangible, non-transitory memory, such as instruction memory 207 of FIG. 2, that may be executed by one or more processors.

Keyword determination engine 402 is operable to receive search request 306 identifying one or more search terms, and determine candidate sponsor campaign data 350, for example as described above with respect to FIG. 3. Candidate sponsor campaign data 350 identifies one or more candidate sponsor campaigns that are associated with a keyword determined from search request 306. Keyword determination engine 402 provides the candidate sponsor campaign data 350 to candidate sponsor campaign optimization engine 404.

Candidate sponsor campaign optimization engine 404 is operable to select at least one sponsor campaign of the one or more candidate sponsor campaigns identified by candidate sponsor campaign data 350 based on computing engagement probabilities for the brand and items identified by candidate sponsor campaign data 350 (e.g., brand data 316, item data 318) for each sponsor campaign. The engagement probabilities may be computed based on the application of one or more algorithms to aggregated impression data 420 and aggregated engagement data 422.

Aggregated impression data 420 identifies, for each brand or item, a number of times the brand or item has been displayed to a user on the website. Aggregated impression data 420 may also identify a date for each previous presentation of the brand or item to the user. Aggregated engagement data 422 identifies, for each brand or item, a number of times a user has previously engaged the brand or item (e.g., clicked on an image of the brand or item on a website, such as website 302) over a period of time. For example, aggregated engagement data 422 may identify a date for each previous engagement.

In some examples, candidate sponsor campaign optimization engine 404 obtains, for each brand and item identified by candidate sponsor campaign data 350, aggregated impression data 420 and aggregated engagement data 422 for that brand or item from application repository 410. Application repository 410 may maintain aggregated impression data 420 and aggregated engagement data 422 for a plurality of items, including any item associated with a sponsor campaign, and their corresponding brands. As described further below, impression data and engagement data for items are provided to application repository 410 by aggregated data update engine 408.

As noted above, candidate sponsor campaign optimization engine 404 may compute engagement probabilities for each brand and corresponding items identified by candidate sponsor campaign data 350 for each sponsor campaign based on the application of one or more algorithms to aggregated impression data 420 and aggregated engagement data 422 for the corresponding brand or item. For example, candidate sponsor campaign optimization engine 404 may compute engagement probabilities by computing a posterior probability distribution of the aggregated impression data 420 and aggregated engagement data 422 for a brand or item. In some examples, the posterior probability distribution is computed according to the following equations:

$$(p_i | c_i \sim \text{Beta}(\alpha_i c_i, \gamma_i + (1 - c_i))) \quad (\text{eq. 1})$$

where:

$$c_i \sim \text{Binomial}(p_i, 1) \quad (\text{eq. 2})$$

$$p_i \sim \text{Beta}(\alpha_i, \gamma_i) \quad (\text{eq. 3})$$

$p_i$ is the engagement probability for a brand or item i
Binomial=binomial distribution[1]
Beta=beta distribution[2]
α is the aggregated number of times the brand or item has been engaged by a user (e.g., aggregated engagement data 422)
γ is the aggregated number of times the brand or item has been displayed to, but not engaged by, a user (e.g., aggregated impression data 420)

[1] see, e.g., https://en.wikipedia.org/wiki/Binomial_distribution
[2] see, e.g., https://en.wikipedia.org/wiki/Beta_distribution Based on the posterior probability distribution of engagement probabilities, an engagement probability for the brand or item is determined. In some examples, candidate sponsor campaign optimization engine 404 randomly selects an engagement probability from the posterior probability distribution of engagement probabilities. In some examples, a machine learning model is applied to determine an engagement probability from the posterior probability distribution of engagement probabilities, where the machine learning model is based on search terms, user engagement history, and advertisement item properties.

Based on one or more of the brand and item engagement probabilities for a sponsor campaign, an overall engagement probability is computed. In some examples, the overall engagement probability is the engagement probability for the brand or item with the highest engagement probability for a sponsor campaign. In some examples, the overall engagement probability is computed based on the average of the engagement probabilities for the brand and the items for the sponsor campaign.

In some examples, the overall engagement probability for a sponsor campaign is computed based on selecting a number (e.g., 2, 4, 8, 10) of the highest engagement probabilities for a sponsor campaign, and combining them to compute the overall engagement probability for the sponsor campaign. For example, the number of highest probabilities may be averaged to compute the overall engagement probability. In some examples, the overall engagement probability for a sponsor campaign is computed according to the following equation:

$$p_b = 1 - \Pi_{i=0}^{4}(1 - p_{b_i}) \quad (\text{eq. 4})$$

where:

$p_b$ is the overall engagement probability for a sponsor campaign $p_{b_i}$ is the probability that a brand, or product, is engaged by a user (e.g., i=0 represents the brand, and i=1, 2, or 3 represents first product, second product, third product, and fourth product, respectively; i.e., $p_i$ from eq. 3 above).

In some examples, the overall engagement probability for a sponsor campaign is computed according to equation 5 above based on the engagement probabilities for a brand and four products associated with the sponsor campaign.

Candidate sponsor campaign optimization engine 404 ma compute the overall engagement probability for a plurality of sponsor campaigns identified by candidate sponsor campaign data 350, such as overall engagement probabilities for first sponsor campaign data 310 and for Nth sponsor campaign data 312. In some examples, the candidate sponsor campaign with the greatest overall engagement probability is selected and provided to digital advertisement serving engine 406 via sponsor campaign data 440.

In some examples, the overall engagement probability for each candidate sponsor campaign is combined with the corresponding price per engagement associated with the candidate sponsor campaign to generate an adjusted engagement probability for the sponsor campaign. The price per engagement for each sponsor campaign, such as price per engagement 320 for first sponsor campaign data 310, may be identified by candidate sponsor campaign data 350. In some examples, the overall engagement probability for a sponsor campaign is multiplied with the corresponding price per engagement for the sponsor campaign to generate the adjusted engagement probability for the sponsor campaign. In these examples, the sponsor campaign with the greatest adjusted probability may be selected and provided to digital advertisement serving engine 406 via sponsor campaign data 440.

Candidate sponsor campaign optimization engine 404 provides selected sponsor campaign data 440 to digital advertisement serving engine 406, which identifies the brand and one or more items corresponding to the selected candidate sponsor campaign. For example, selected sponsor campaign data 440 may identify the brand and one or more items that were used to compute the overall engagement probability and/or adjusted engagement probability for the selected sponsor campaign.

Digital advertisement serving engine 406 is operable to determine at least one digital advertisement based on selected sponsor campaign data 440. For example, a database, such as database 116, may store digital advertisements associated with each brand and item of a sponsor campaign. A digital advertisement for a brand may be, for example, a digital image of a logo for the brand. An example of a digital advertisement for an item may be, for example, a digital image of the item. Based on the brand identified by selected sponsor campaign data 440, digital advertisement serving engine 406 may determine a corresponding digital advertisement for the brand that may be stored in the database. Digital advertisement serving engine 406 may provide brand advertisement data 330 identifying the corresponding digital advertisement for the brand.

Similarly, based on an item identified by selected sponsor campaign data 440, digital advertisement serving engine 406 may determine a corresponding digital advertisement for the item that may be stored in the database. Digital advertisement serving engine 406 may provide item advertisement data 332 identifying the corresponding digital advertisement for the brand. Brand advertisement data 330 and item advertisement data 332 may be provided to a web server, such as server 104, to serve the advertisements on a website, such as website 302.

Digital advertisement serving engine 406 may also be operable to receive web server data 430 from a web server, such as server 104, which identifies whether a digital advertisement, such as one for a brand or item, has been displayed on a website. For example, web server data 430 may indicate that a digital advertisement for a brand identified in brand advertisement data 330 has been displayed on a website, such as website 302. Similarly, web server data 430 may indicate that a digital advertisement for an item identified in item advertisement data 332 has been displayed on a website.

Digital advertisement serving engine 406 may store impression data 416 relating to the display of the digital advertisement in application repository 412. Impression data 416 may identify one or more of the brand or item associated with the display digital advertisement (e.g., brand data 316, item data 318), the sponsor campaign associated with the display digital advertisement (e.g., first sponsor campaign data 310), a date of the display digital advertisement, or a timestamp of the display digital advertisement.

Web server data 430 may also indicate that a digital advertisement for a brand identified in brand advertisement data 330 has been engaged (e.g., clicked on) by a user on the website, such as website 302. Similarly, web server data 430 may indicate that a digital advertisement for an item identified in item advertisement data 332 has been engaged by a user on a website.

Digital advertisement serving engine 406 may store engagement data 418 relating to the engagement of the digital advertisement in application repository 412. Engagement data 418 may identify one or more of the brand or item associated with the engagement of the digital advertisement (e.g., brand data 316, item data 318), the sponsor campaign associated with the engagement of the digital advertisement (e.g., first sponsor campaign data 310), a date of the engagement of the digital advertisement, or a timestamp of the engagement of the digital advertisement.

Aggregated data update engine 408 may be operable to determine and store aggregated impression data 420 and aggregated engagement data 422 to application repository 410. For example, aggregated data update engine 408 may obtain impression data 416 from local repository 412, determine a brand or item corresponding to (e.g., identified by) impression data 416, and determine aggregated impression data 420 based on the application of one or more algorithms. Similarly, aggregated data update engine 408 may obtain engagement data 418 from local repository 412, determine a brand or item corresponding to (e.g., identified by) engagement data 418, and determine aggregated engagement data 422 based on the application of one or more algorithms.

In some examples, aggregated data update engine 408 determines a total number of impressions, and a total number of engagements, for a brand or item corresponding to engagement data 418, and stores the total amounts as aggregated impression data 420 and aggregated engagement data 422, respectively. In some examples, only impressions and engagements of a digital advertisement that have executed over a previous amount of time (e.g., a week, a month, a year) are totaled. For example, earlier impressions or engagements of the digital advertisement are not considered in the totals.

In some examples, aggregated data update engine 408 applies a time decay algorithm, such as an exponentially time decayed algorithm, to determine aggregated impression data 420 and/or aggregated engagement data 422. For example, aggregated data update engine 408 may apply an exponentially time decayed algorithm that determines the aggregated impression data 420 and/or aggregated engagement data 422 according to the equation below:

$$N_T = N_{T-k}\alpha^k + \Sigma_{t=(T-k+1)}^{T} n_t \alpha^{T-t} \qquad \text{(eq. 5)}$$

where:

$$a = 0.5^{\frac{1}{H}}$$

$N_T$ is the time decayed cumulative count at time interval T (e.g., aggregated impression data 420, aggregated engagement data 422)

$n_t$ is the time decayed raw count of activity at time interval t (e.g., impression data 416, engagement data 416))

H is a half lifecycle defined as a number of time intervals

T is the timestamp at which the decayed count is being computed k is the number of time intervals between the last decayed count computation and the current timestamp Aggregated data update engine 408 may update aggregated impression data 420 and/or aggregated engagement data 422 periodically, such as hourly, daily, or monthly. In some examples, aggregated data update engine 408 updates aggregated impression data 420 and/or aggregated engagement data 422 in real time.

Figure 5:
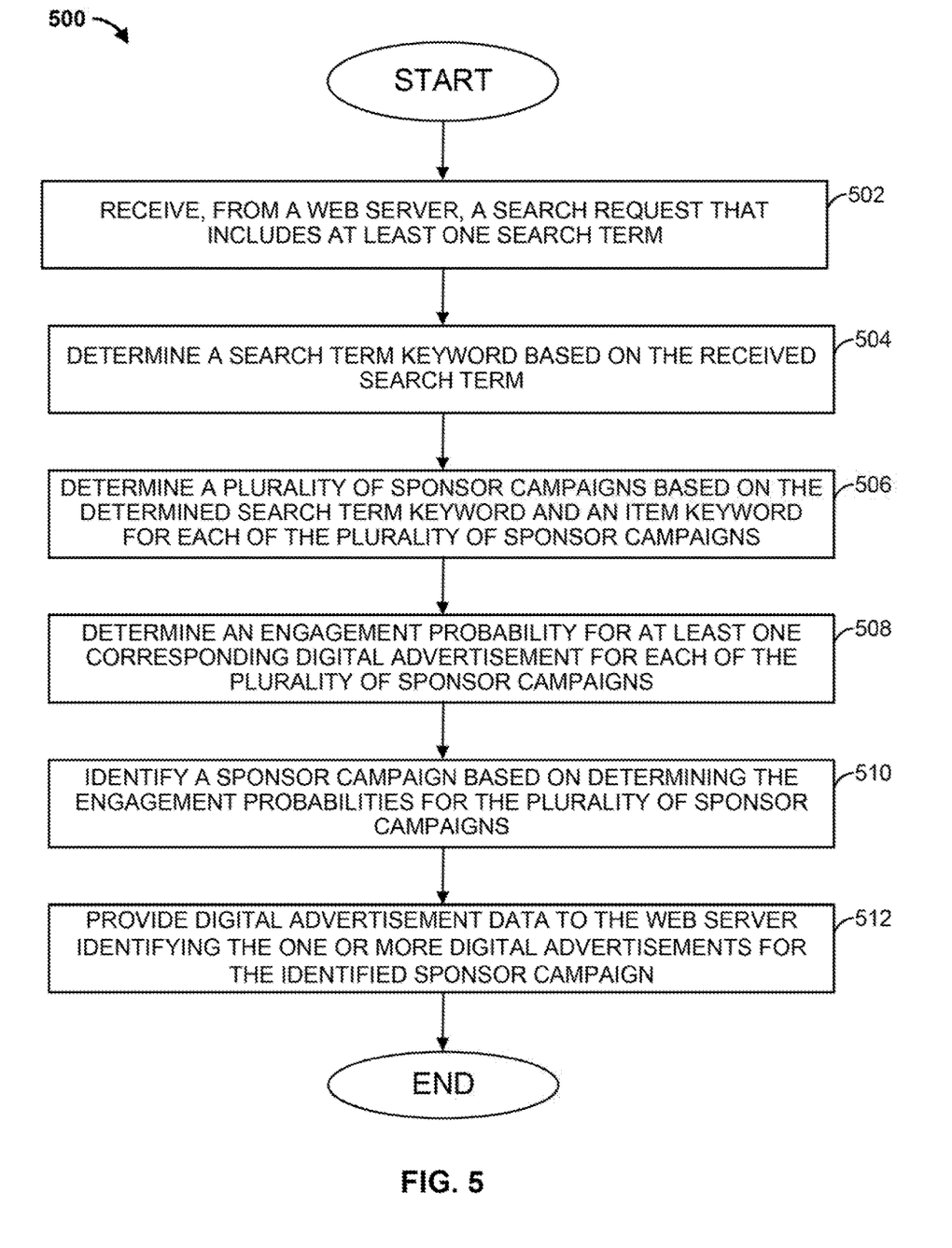
FIG. 5 is a flowchart of an example method that can be carried out by the digital advertisement identification system 100 of FIG. 1 in accordance with some embodiments.

FIG. 5 is a flowchart of an example method 500 that can be carried out by the digital advertisement identification system 100 of FIG. 1. Beginning at step 502, a computing device, such as advertisement identification computing device 102, receives, from a web server, such as server 104, a search request that includes at least one search term. At step 504, the computing device determines a search term keyword based on the received search term. For example, the computing device may apply one or more NLP algorithms, such as adaptive, statistical, or dynamic NLP algorithms, to the received search request to determine the received search term, and parse the received search term to determine the search term keyword. At step 506, the computing device determines a plurality of sponsor campaigns based on the determined search term keyword and an item keyword for each of the plurality of sponsor campaigns. For example, the computing device may determine the plurality of sponsor campaigns based on whether the search term keyword matches an item keyword associated with each sponsor campaign.

Proceeding to step 508, the computing device determines an engagement probability for at least one corresponding digital advertisement for each of the plurality of sponsor campaigns. At step 510, the computing device identifies a sponsor campaign of the plurality of sponsor campaigns based on determining an engagement probability for at least one corresponding digital advertisement for each of the plurality of sponsor campaigns. For example, the computing device may identify the sponsor campaign with the highest average engagement probability for the sponsor campaign's corresponding digital advertisements. At step 512, the computing device provides digital advertisement data to the web server identifying the one or more digital advertisements for the identified sponsor campaign. The web server may then display the one or more digital advertisements.

Figure 6:
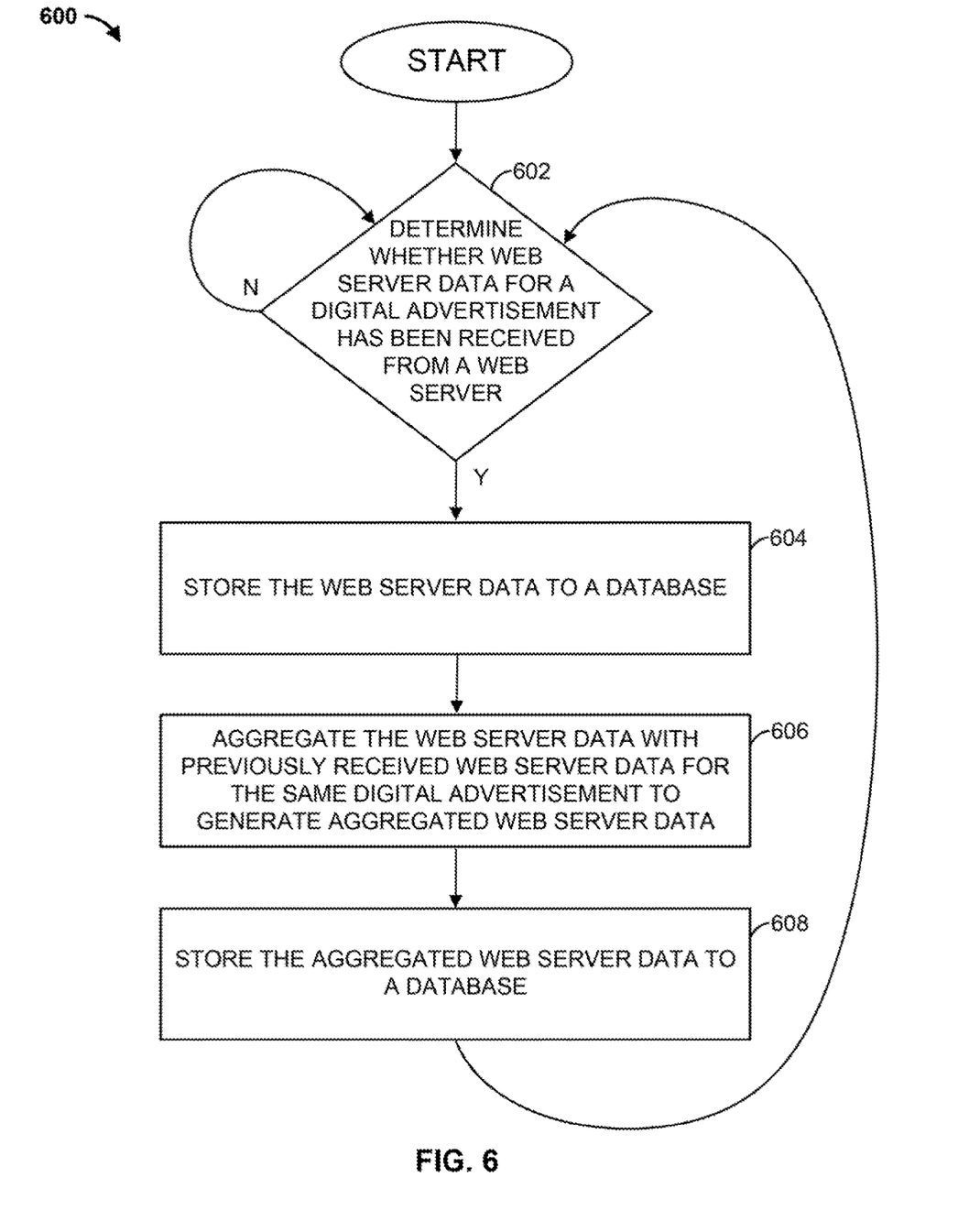
FIG. 6 is a flowchart of another example method that can be carried out by digital advertisement identification system 100 of FIG. 1 in accordance with some embodiments.

FIG. 6 is a flowchart of another example method 600 that can be carried out by the digital advertisement identification system 100 of FIG. 1. At step 602, a computing device, such as advertisement identification computing device 102, determines whether web server data for a digital advertisement, such as web server data 430, has been received from a web server, such as server 104. Upon receiving web server data, the method proceeds to step 604, where the computing device stores the web server data to a database, such as database 116. At step 606, the computing device aggregates the web server data with previously received web server data for the same digital advertisement to generate aggregated web server data. For example, the computing device may apply an exponentially time decayed algorithm to the received web server data and the previously received web server data to generate the aggregated web server data. The aggregated web server data may include aggregated impression data 420 and/or aggregated engagement data 422, for example. At step 608, the computing device stores the aggregated web server data to a database, such as database 116, and proceeds back to step 602.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
 a server configured to:
  generate, based on an exponentially time decayed algorithm, aggregated impression data by monitoring a frequency of display of each of a plurality of elements in one or more prior interfaces over a specified period of time, wherein the aggregated impression data is stored in a database;
  generate, based on the exponentially time decayed algorithm, aggregated engagement data by monitoring a frequency of interaction for each of the plurality of elements in the one or more prior interfaces over a specified period of time, wherein the aggregated engagement data is stored in the database;

receive a request for an interface from a requesting system, the request including a search request;

generate the interface including a corresponding item associated with a selected campaign; and provide the interface including the corresponding item to the requesting system that generated the request for the interface, wherein the requesting system is configured to display the interface;

a keyword determination engine configured to:
receive, from the server, the search request;
extract search terms from the search request by applying a natural language processing algorithm to the search request;
identify at least one search keyword by parsing the search terms;
determine a plurality of campaigns, wherein each campaign of the plurality of campaigns includes data elements representative of at least one item keyword and at least one corresponding item, wherein the plurality of campaigns includes campaigns having at least one item keyword corresponding to the at least one search keyword; and a processor configured to:
determine an overall engagement probability for each of the plurality of campaigns, wherein the overall engagement probability is determined by:
generating an item engagement probability distribution by a posterior probability distribution of the aggregated impression data and the aggregated engagement data of the at least one corresponding item, wherein the posterior probability distribution is based on a binomial and a beta distribution;
generating, by a machine learning model and based on the item engagement probability distribution, an item engagement probability for the at least one corresponding item of each of the plurality of campaigns; and
generating the overall engagement probability for each campaign by averaging the item engagement probability for each item of the campaign or selecting a maximum item engagement probability for the at least one corresponding item;
select the campaign of the plurality of campaigns having a highest overall engagement probability; and
provide output data to the server including the at least one corresponding item associated with the campaign;

wherein after the server generates the interface, the server is configured to:
receive impression data and engagement data for the interface including the at least one corresponding item associated with the selected campaign;
generate updated aggregated impression data and updated aggregated engagement data based on the received impression data and engagement data for the interface including the at least one corresponding item associated with the selected campaign; and
generate a second interface including at least one second item associated with a second campaign, wherein the second campaign is selected based on an updated overall engagement score of each campaign, wherein the updated overall engagement score is based, at least in part, on updated item engagement probabilities based on the updated aggregated impression data and the updated aggregated engagement data.

2. The system of claim 1, wherein the updated aggregated impression data and the updated aggregated engagement data is generated by applying the exponentially time decayed algorithm to the received impression data and engagement data for the interface including the corresponding item associated with the selected campaign.

3. The system of claim 1, wherein determining the overall engagement probability for each of the plurality of campaigns includes modifying the averaged item engagement probability or the maximum item engagement probability is based on a price per engagement for the at least one corresponding item for each of the plurality of campaigns.

4. The system of claim 1, wherein determining the overall engagement probability includes:
generating an engagement probability for brand data for each of the plurality of campaigns; and
determining the overall engagement probability based on a summation of the engagement probability for the brand data and the item engagement probability of the at least one corresponding item for each of the campaigns.

5. The system of claim 1, wherein the plurality of campaigns is determined based on a semantic match between the search terms and the at least one item keyword.

6. The system of claim 1, wherein the search terms are determined by a keyword determination engine.

7. A computer-implemented method comprising:
generating, by a server and based on an exponentially time decayed algorithm, aggregated impression data by monitoring a frequency of display of each of a plurality of elements in one or more prior interfaces over a specified period of time;
generating, by the server and based on an exponentially time decayed algorithm, aggregated engagement data by monitoring a frequency of interaction of each of the plurality of elements in the one or more prior interfaces over a specified period of time;
receiving, from the server at a processor, a search request;
extracting search terms from the search request by applying a natural language processing algorithm to the search request;
identifying at least one search keyword by parsing the search terms;
determining a plurality of campaigns, wherein each of the plurality of campaigns includes data elements representative of at least one item keyword and at least one corresponding item, wherein the plurality of campaigns includes campaigns having at least one item keyword corresponding to the at least one search keyword;
determining an overall engagement probability for each of the plurality of campaigns, wherein the overall engagement probability is determined by:
generating an item engagement probability distribution by a posterior probability distribution of the aggregated impression data and the aggregated engagement data of the at least one corresponding item, wherein the posterior probability distribution is based on a binomial and a beta distribution;
generating, by a machine learning model and based on the item engagement probability distribution, an item engagement probability for the at least one corresponding item of each of the plurality of campaigns, wherein the item engagement probability is determined by a posterior probability distribution of the aggregated impression data and the aggregated engagement data; and generating the overall engagement probability for each campaign by averaging the item engagement probability for each item of the campaign or selecting a maximum item engagement probability for the at least one corresponding item;

selecting one of the plurality of campaigns having a highest overall engagement probability;

providing output data to the server including the at least one corresponding item for the selected one of the plurality of campaigns;

generating, by the server, an interface including the at least one corresponding item;

providing, by the server, the interface including the at least one corresponding item to a device that generated the search request;

receiving impression data and engagement data for the interface including the at least one corresponding item associated with the selected one of the plurality of campaigns;

generating updated aggregated impression data and updated aggregated engagement data based on the received impression data and engagement data for the interface including the at least one corresponding item associated with the selected one of the plurality of campaigns; and generating a second interface including at least one second item associated with a second campaign, wherein the second campaign is selected based on an updated overall engagement score of each campaign, wherein the updated overall engagement score is based, at least in part, on updated item engagement probabilities based on the updated aggregated impression data and the updated aggregated engagement data.

8. The computer-implemented method of claim 7, wherein the plurality of campaigns is determined based on a semantic match between the search terms and the at least one item keyword.

9. The computer-implemented method of claim 7 further comprising generating the updated aggregated impression data and the updated aggregated engagement data by applying the exponentially time decayed algorithm to the received impression data and engagement data for the interface including the at least one corresponding item associated with the selected one of the plurality of campaigns.

10. The computer-implemented method of claim 7 wherein determining the overall engagement probability for each of the plurality of campaigns includes modifying the averaged item engagement probability or the maximum item engagement probability based on a price per engagement for the at least one corresponding item for each of the plurality of campaigns.

11. The computer-implemented method of claim 7 wherein determining the overall engagement probability includes:

generating, an engagement probability for brand data for each of the plurality of campaigns; and determining the overall engagement probability based on a summation of the engagement probability for the brand data and the item engagement probability of the at least one corresponding item for each of the campaigns.

12. A non-transitory computer readable medium having instructions stored thereon, wherein the instructions, when executed by at least one processor, cause a device to perform operations comprising:

receiving, from a server, a search request;

extracting search terms from the search request by applying a natural language processing algorithm to the search request;

identifying at least one search keyword by parsing the search terms;

determining a plurality of campaigns, wherein each of the plurality of campaigns includes data elements representative of at least one item keyword and at least one corresponding item, wherein the plurality of campaigns includes campaigns having at least one item keyword corresponding to the at least one search keyword;

determining an overall engagement probability for each of the plurality of campaigns, wherein the overall engagement probability is determined by:

generating an item engagement probability distribution by a posterior probability distribution of aggregated impression data and aggregated engagement data of the at least one corresponding item, wherein the posterior probability distribution is based on a binomial and a beta distribution;

generating, by a machine learning model and based on the item engagement probability distribution, an item engagement probability for the at least one corresponding item of each of the plurality of campaigns, wherein the item engagement probability is determined by a posterior probability distribution of the aggregated impression data and the aggregated engagement data obtained by monitoring a frequency of display for a plurality of elements and a frequency of interaction for the plurality of elements in one or more prior interfaces; and generating the overall engagement probability for each campaign by averaging the item engagement probability for each item of the campaign or selecting a maximum item engagement probability for the at least one corresponding item;

selecting one of the plurality of campaigns having a highest overall engagement probability;

providing output data to the server including the at least one corresponding item for the selected one of the plurality of campaigns;

generating, by the server, an interface including the at least one corresponding item;

providing, by the server, the interface including the at least one corresponding item to a device that generated the search request;

receiving impression data and engagement data for the interface including the at least one corresponding item associated with the selected one of the plurality of campaigns;

generating updated aggregated impression data and updated aggregated engagement data based on the received impression data and engagement data for the interface including the at least one corresponding item associated with the selected one of the plurality of campaigns; and generating a second interface including at least one second item associated with a second campaign, wherein the second campaign is selected based on an updated overall engagement score of each campaign, wherein the updated overall engagement score is based, at least in part, on updated item engagement probabilities based on the updated aggregated impression data and the updated aggregated engagement data.

13. The non-transitory computer readable medium of claim 12, wherein the plurality of campaigns is determined based on a semantic match between the search terms and the at least one item keyword.

* * * * *